United States Patent [19]
Davidson et al.

[11] Patent Number: 5,605,628
[45] Date of Patent: *Feb. 25, 1997

[54] COMPOSITE MEMBRANES

[75] Inventors: Alexander P. Davidson, Shipston-on-Stour, United Kingdom; Michael P. Thomas, Westmount, Canada; Steven W. Summers, Radford Semele, United Kingdom; David R. Cowieson, Newton, United Kingdom; Peter J. Williams, Frodsham, United Kingdom

[73] Assignee: North West Water Group PLC, Warrington, United Kingdom

[ * ] Notice: The term of this patent shall not extend beyond the expiration date of Pat. No. 5,376,442.

[21] Appl. No.: 349,985

[22] Filed: Dec. 6, 1994

Related U.S. Application Data

[63] Continuation-in-part of Ser. No. 37,712, Mar. 24, 1993, Pat. No. 5,376,442, which is a continuation of Ser. No. 884,214, May 11, 1992, abandoned, which is a continuation of Ser. No. 355,646, May 22, 1989, abandoned.

[30] Foreign Application Priority Data

May 24, 1988 [GB] United Kingdom ............... 8812217
Feb. 7, 1989 [GB] United Kingdom ............... 8902649

[51] Int. Cl.$^6$ ............................................. B01D 63/00
[52] U.S. Cl. ............... 210/321.83; 210/487; 210/500.25; 210/500.26; 264/60; 428/307.7; 428/312.8; 428/311.51; 442/18; 442/73; 442/74
[58] Field of Search ............................ 210/321.83, 487, 210/500.25, 500.26; 428/224, 225, 307.7, 311.5, 312.8, 256; 264/60

[56] References Cited

U.S. PATENT DOCUMENTS

| | | | |
|---|---|---|---|
| 2,980,532 | 4/1961 | Martensson et al. | 75/205 |
| 3,022,187 | 2/1962 | Eyraud et al. | 428/312.2 |
| 4,356,215 | 10/1982 | Auriol et al. | |
| 4,613,369 | 9/1986 | Koehler | 75/246 |
| 4,680,221 | 7/1987 | Murayama et al. | 428/246 |
| 4,692,354 | 9/1987 | Asaeda et al. | |
| 4,711,719 | 12/1987 | Leenaars et al. | 210/500.26 |
| 4,722,771 | 2/1988 | Textor et al. | |
| 4,738,874 | 4/1988 | Berardo et al. | 427/244 |
| 4,761,323 | 8/1988 | Mühlratzer et al. | |
| 4,762,619 | 8/1988 | Gaddis et al. | 210/639 |
| 4,837,055 | 6/1989 | Bitter | 427/244 |
| 4,888,033 | 12/1989 | Charpin et al. | 428/312.8 |
| 4,888,114 | 12/1989 | Gaddis et al. | 210/500.25 |
| 4,935,139 | 6/1990 | Davidson et al. | 210/490 |
| 4,944,996 | 7/1990 | Bauer et al. | 428/307.7 |
| 4,981,590 | 1/1991 | Vantveen et al. | 210/490 |

FOREIGN PATENT DOCUMENTS

| | | |
|---|---|---|
| 1239011 | 7/1988 | Canada . |
| 0040282 | 5/1980 | European Pat. Off. . |
| 0219383 | 9/1986 | European Pat. Off. . |
| 0223022 | 10/1986 | European Pat. Off. . |
| 0224444 | 6/1987 | European Pat. Off. . |
| 0242208 | 10/1987 | European Pat. Off. . |
| 2463636 | 2/1981 | France . |
| 2502508 | 10/1982 | France . |
| 3515025 | 10/1986 | Germany . |
| 79631 | 12/1979 | Luxembourg . |
| 1173179 | 12/1969 | United Kingdom . |

Primary Examiner—James J. Bell
Attorney, Agent, or Firm—Cooper & Dunham

[57] ABSTRACT

A composite membrane comprises an inorganic support having interstices and porous inorganic films of sintered non-metallic particles carried by the support and bridging the interstices thereof. The support is preferably a woven metal mesh, with the films substantially coplanar with the support. The films may be formed by applying a suspension of refractory particles in a polymer solution to bridge the interstices of the support, and heating the films to partly sinter the particles. Since the films are in compression at ambient temperature, any cracks that may be formed by damage to the composite membrane tend not to propagate.

21 Claims, 7 Drawing Sheets

Fig. 5.
| Fig.5a. | Fig.5e. |
| Fig.5b | Fig.5f. |
| Fig.5c. | Fig.5g. |
| Fig.5d. | Fig.5h. Fig.5i |
Fig.5a.
Fig.5b.
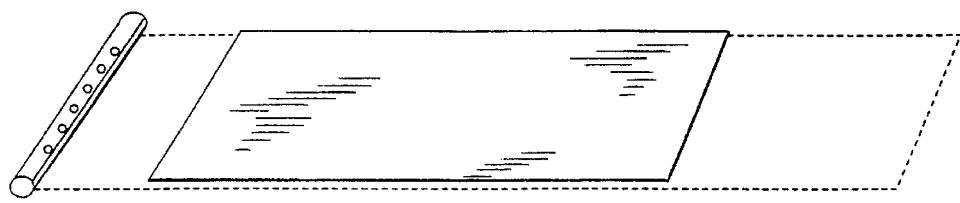
Fig.5c.
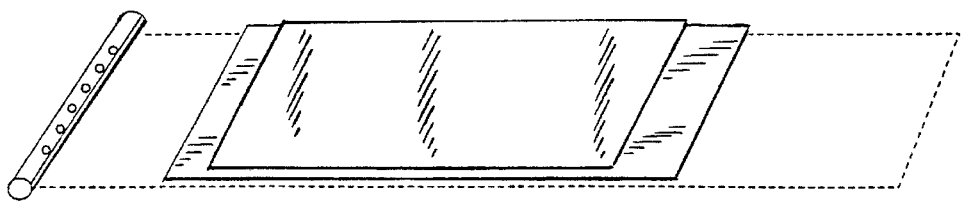
Fig.5d.
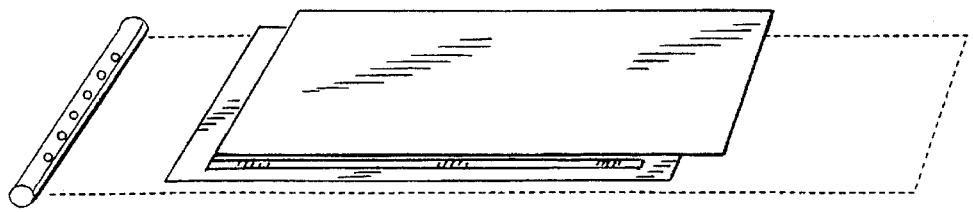

Fig.6.
| Fig.6a. | Fig.6d. |
| Fig.6b. | Fig.6e. |
|         | Fig.6f. |
| Fig.6c. | Fig.6g. Fig.6h. |
Fig.6a.
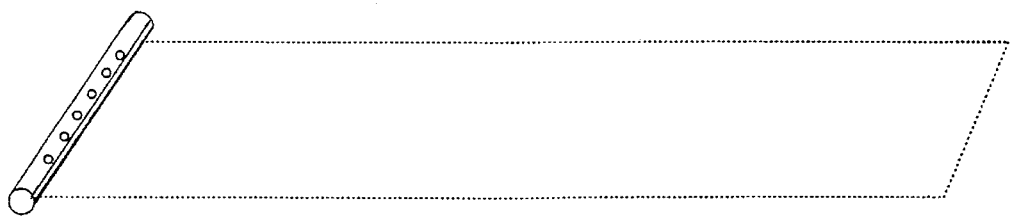
Fig.6b.
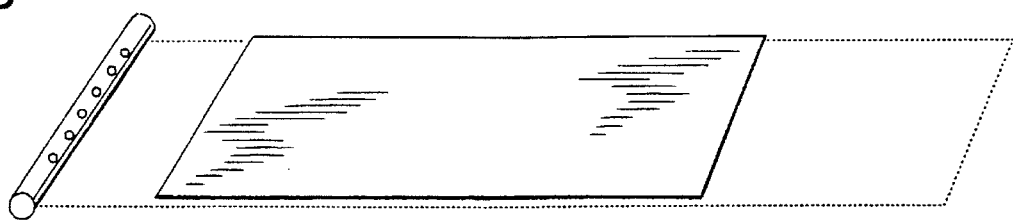
Fig.6c.
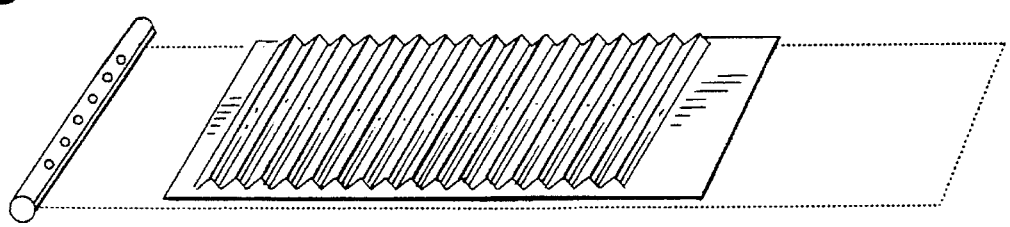

COMPOSITE MEMBRANES

This application is a continuation-in-part of U.S. patent application Ser. No. 037,712, filed Mar. 24, 1993, now U.S. Pat. No. 5,376,442 which is a continuation of application Ser. No. 884,214, filed May 11, 1992 (now abandoned), which was a continuation of application Ser. No. 355,646, filed May 22, 1989 (now abandoned).

EPA 242208 describes composite membranes comprising a porous inorganic support and a microporous inorganic film overlying a surface of the support. The supports there envisaged are of alumina, particularly sheets of anodic aluminium oxide. Such composite membranes have advantages of chemical inertness, a rather uniform pore size, substantial freedom from cracks or pinholes, and high flux, and have been commercially successful. But they do suffer from a few disadvantages: they are somewhat expensive and fragile; they are not plastically deformable, and cannot easily be shaped; if cracks do form, they tend to propagate; and they are difficult to attach e.g. to filter supports. It is an object of this invention to provide composite membranes which reduce or overcome these disadvantages.

The present invention provides a composite membrane comprising an inorganic support having interstices and porous inorganic films of sintered non-metallic particles carried by the support and bridging the interstices thereof. Preferably the membrane is plastically deformable without substantially altering the porosity or permeability of the films. Preferably the films are substantially co-planar with the support.

The inorganic supports are porous by virtue of having interstices. A pore is characterised by having a length which is large in comparison to its diameter, and the latter is no larger than 4 μm. By contrast, the interstices of the support are characterized by having a diameter greater than 5 μm, preferably greater than 10 μm, and the length of the interstice is preferably less than 10 times the diameter. The term diameter is here used to refer to the average cross sectional dimension of the aperture, or to the minimum cross sectional dimension when the aperture is far from circular.

The support is preferably of woven or nonwoven fibres, the term fibre being used to include filaments and wires which may be continuous or discontinuous. Although glass and other refractories can be used, the support is preferably of metal, particularly in the form of a woven metal mesh. Suitable woven mesh supports may comprise one or more layers of meshes and which may have a different interstice sizes. The nature of the metal is not very critical, and one suitable metal is stainless steel.

The interstices of the support generally have an average diameter in the range 5 μm to 5 mm, preferably 10 μm to 1 mm. A preferred support is a 100 mesh woven stainless steel mesh which has interstices of 135 μm diameter. The utility of 70 mesh and even 20 mesh woven metal sheets has been demonstrated.

It is surprising that such coarsely porous supports can provide composite membranes having useful properties. The conventional wisdom has been that very thin porous films must be supported on very finely porous supports, so as to ensure that the film bridges the pores of the support. This invention demonstrates that, under suitable conditions, relatively coarsely porous supports can be used. An advantage of such composite membranes is that the film is generally coplanar with the porous support, so that bending the membrane does not necessarily involve stretching the film. It may be preferable to flatten the weave, e.g. by rolling or hammering the mesh or sheet, so as to ensure that the film bridging each pore is more nearly coplanar with the sheet.

Alternatively, the support may be an expanded metal mesh. Advantages of this structure are that the mesh extends perpendicular to the plane of the support which helps to create turbulence in a fluid being filtered and so avoid blockage; and that the porous films bridging the pores or cells of the mesh may themselves be at an angle to the plane of the support.

Alternatively, the support may be a metal foil having holes bridged by the porous inorganic films. Holes can be punched in metal foil, e.g. in a regular array, or leaving hole-free regions, along which the foil can be bent or folded to give a filter having a high specific surface area. When the foil is dipped in or coated with a sol or suspension, the resulting film may bridge the holes and overlie the remainder of the foil surface. Any cracking of the film, that may occur when the foil is bent, in regions overlying the foil will not damage the properties of the membrane as a filter.

These interstices are bridged by porous films of inorganic material carried by the support. Porous films include those suitable for separation and filtration processes including the ultra-filtration and micro-filtration ranges. Ultra-filtration is generally accepted to be defined by retention of molecules or particles of the size range 20 nm down to 1 nm (1 nm=1 nanometer=$10^{-9}$ m). An alternative way of expressing this filtration range is by converting molecular size to molecular weight: on this basis it is the retention of species in the molecular weight range of 300,000 to 300. Micro-filtration is generally accepted to cover the size range of 20 nm up to 2000 nm (i.e. 0.02 to 2 μm). Although there is no critical upper limit, the porous films preferably have an average pore diameter not more than 2% of the average diameter of the fibres of the support.

After sintering, the pore size of the porous film is related to the particle size. Large particles, above about 1 μm in diameter, result in a pore size of approximately 10% of the particle diameter. Sub-micron particles may tend to give a pore size which is about 50% of the particle diameter.

The films may be of sintered non-metallic particles, for example titania, alumina, ceria, zirconia, lead zirconate titanate (PZT), silica, mullite, refractory metal oxides generally, and mixtures thereof. Such films can be formed by techniques generally known, by applying a suspension of the particles or precursors thereof to the support, dewatering the suspension (or otherwise removing the suspending medium), and heating the resulting layer to a temperature to partially sinter the particles. Where the particles are of sub-micron size, this technique may involve applying a sol to the support, converting the sol to a gel and heating the gel. It is necessary that the contact area between the particles and the surfaces of the support be sufficiently great for the two to adhere together so that the films are bound to the support. This requirement places an upper limit on the permissible size of the particles. For example, where the support is composed of fibres, the particles of the films should have an average diameter not more than 20%, preferably not more than 10%, of the average diameter of the fibres.

When the films are formed from a suspension, that suspension may comprise 60–95%, preferably 75–90%, by weight of relatively larger particles, the balance being of much smaller particles. The larger particles may have an average size in the range 0.5–50 μm, particularly 1–10 μm, chosen to generate films with pores of desired size. The smaller particles may have an average size in the range 4 nm up to 1 μm, but not more than 0.1 times the size of the larger particles. The smaller particles act as a sintering aid, permitting the film to be sintered at lower temperatures than would other-wise be possible. They also improve adhesion between the films and the support. The proportions of the smaller particles should not be so great as to substantially block the pores between the larger particles.

One embodiment of the invention involves using a colloidal sol of an inorganic material (such as a ceramic oxide) or a solution of a polymeric precursor to an inorganic material (such as a ceramic oxide) to the support. The colloidal sol may be derived by known means from an inorganic oxide powder, such as an oxide of the elements mentioned above. More preferably the colloidal sol or polymeric solution is derived by hydrolysis of a metal alkoxide. For example, boehmite sols may be prepared using the procedure described in U.S. Pat. No. 3,944,658. According to this procedure, an aluminium alkoxide is hydrolysed in an excess of water maintained at 80° C., and subsequently peptized with an acid, to form a clear transparent sol. The sol consists of colloidal particles of stable crystalline aluminium monohydrate, AlO(OH), dispersed in the aqueous phase. The sol so produced typically contains about 30 $gl^{-1}$ of aluminium values expressed as $Al_2O_3$, and can be adjusted to the desired concentration for coating by dilution with water or evaporation. Coatings may be achieved with sols of concentration up to 190 $gl^{-1}$, preferably 10 $gl^{-1}$ to 90 $gl^{-1}$, of aluminium values expressed as $Al_2O_3$. The sols may be hydrothermally treated to increase particle size and hence viscosity. A typical treatment would be to heat for 3 hours at 200° C. in an autoclave. As an alternative example, —Ti—O—Ti— polymer solutions may be prepared using a procedure similar to that described in the article by C J Brinker and M S Harrington in Solar Energy Materials, 1981, volume 5, 159–172, wherein a titanium alkoxide is partially hydrolysed in an alcoholic solution at room temperature in the presence of an acid catalyst to form a stable —Ti—O—Ti— polymer solution. The solution so produced typically contains about 10 to 30 $gl^{-1}$ of titanium values expressed as $TiO_2$, and can be adjusted to the desired concentration for coating by evaporation of solvent or further dilution with alcohol. The sol or solution can be applied to the support in the freshly concentrated state, or aged to increase its viscosity prior to application.

Control over the film thickness in the composite membrane can be achieved in part by control over the concentration and viscosity of the suspension or sol prior to application to the support. The films in each interstice need to be self supporting, and may preferably have a minimum thickness of at least 0.01 and preferably at least 0.2 μm. Generally, a single film is formed, with portions overlying the surface of the support and portions bridging the interstice. Since the portion of the film bridging one interstice is generally quite independent of the portions bridging neighbouring interstices, each portion has been regarded for the purposes of this specification as a separate film. These films (bridging the interstices of the support) are generally co-planar with the support, so that they are not subjected to tension throughout the thickness. This reduces the tendency for cracks to grow through the thickness. Generally, a meniscus effect is observed, by which each film has a minimum thickness in the middle of the interstice, which thickness is generally about the same as or less than the thickness of the support. Where the minimum film thickness across the interstice is more than about twice the thickness of the support, the films can no longer be said to be carried by the support.

It is preferred that the support has a coefficient of linear expansion at least as great as, and desirably greater than, that of the inorganic films. This feature has the following consequence. The composite membrane first comes into existence at an elevated temperature at which it is heated to convert a gel to a film or to sinter particles into a film. On subsequent cooling, the support shrinks faster than the films, with the result that the films are under compression. As a result, any cracks that do develop in the films bridging the interstices due to damage or deformation, tend to close rather than to propagate.

The composite membranes of this invention can preferably be plastically deformed without substantially altering the porosity or permeability of the films. Where the film is a composite membrane comprising several layers of different pore size, the fine pore layers must be on the inside of the bend, i.e. under compression. When the support is a fibrous mesh, this test should be performed by flexing the support about an axis parallel to one set of fibres. Because the films are preferably generally co-planar with the support, such flexing does not significantly stretch or compress the films. Because the films are generally in a state of compression, any cracks that may develop tend to close rather than to propagate. Film-forming material overlying the (fibres of the) support may stretch and crack when the support is flexed, but such stretching or cracking should not have any major effect on the porosity or permeability of the films bridging the interstices.

In order to assist bridging of the interstices of the support, it may be desirable to increase the viscosity of the sol or suspension. This can be done simply by adding a relatively viscous miscible organic liquid. Alternatively, a relatively viscous relatively high boiling point liquid, for example a polymer such as polyvinyl alcohol or a polyol such as ethylene glycol or glycerol, may be added and thereafter heated to remove some or all of the less viscous liquid but without breaking down the colloidal dispersion or solution of inorganic material.

Addition to the sol or suspension of a binder may be helpful. Various materials can be used for this purpose, including polyvinyl alcohol and methyl cellulose. In addition to thickening the sol or suspension, a material of this kind may act as a film-forming binder, or may, particularly in the case of methyl cellulose, act as a wetting agent. Suitable concentrations are readily determined by experiment, and are likely to be in the range of 10 to 50 $gl^{-1}$.

Addition of a surface active agent to the sol or suspension prior to application aids the formation of thin uniform films. Non-ionic surfactants such as Nonidet (Octylphenyl ethylene oxide condensate supplied by BDH Chemicals), or Methocel (methyl cellulose polymer supplied by Dow Chemical Company) added typically at the concentration level of 0.1 to 1 percent by weight, can result in thinner uniform films than are otherwise obtainable.

The films can be formed on the support by deposition of a concentrated sol or suspension followed by air drying. Various techniques including brush, spray, dip, electrophoretic and thermophoretic techniques may be used to apply the sol or suspension to the support. Spray coatings can be applied using an aerosol method. With mesh supports, application of sol or suspension is preferably effected by dipping, brush coating, roller coating or spraying. It is often preferable to perform the dipping procedure two or more times, a film being formed by ambient temperature drying or heat treating between each dip. By this means, more reliably complete coverage of all interstices of the substrate may be achieved. In order to aid adhesion, the metal or other support may be pretreated by coating with a dilute sol or suspension of the same composition, which merely coats the fibres of a mesh without forming films over the interstices. Where porous inorganic films have been formed bridging the interstices of the support, it may be advantageous to apply over one or both surfaces thereof a microporous inorganic film. Such microporous inorganic films preferably have an average thickness of less than 10.0 µm, most preferably from 0.05 to 5.0 µm and a substantially uniform pore size from 0.5 to 200 nm, preferably 0.5 to 30 nm, substantially free of cracks and pin holes, and may be formed by a sol gel technique as described in EPA 242208. Alternatively, a microporous layer having a pore size of greater than 0.1 µm, but less than the pore size of the inorganic film bridging the interstices of the support, may be applied to at least one face. Such films may be applied by dipping, spraying or filtration of a suspension of fine ceramic particles, preferably in an aqueous medium, and followed by sintering.

The freshly coated support is then heated to transform the layer into a permeable or porous refractory film. For example, heating converts a boehmite gel layer into a mechanically stable gamma-$Al_2O_3$ structure. Heating conditions are not critical to the invention and may be conventional, bearing in mind the need to avoid thermal shock which might result in the formation of cracks or pin-holes. A typical heating schedule for a boehmite gel layer might be:
(a) heating at 50° C. per hour to 200° C. followed by isothermal treatment at 200° C. for 15 minutes,
(b) subsequent heating at 200° C. per hour to 450°–650° C. followed by an isothermal hold for 15 minutes,
(c) cooling at 50° C. per hour to room temperature. The first part of the heating schedule up to 200° C. is designed to remove absorbed water; the second stage to 450°–650° C. removes bound water, burns off any binder and transforms the gamma-AlOOH to gamma-$Al_2O_3$. This transformation occurs at temperatures at or above 390° C. Finally, the individual isolated particles of alumina sinter together, eventually becoming fully dense if a high enough temperature is reached. At high temperatures, organic binders burn out and may leave voids which contribute to porosity. If these are not desired, it may be preferred to apply a final coating of a sol not containing any organic binder.

On cooling to room temperature, the metal support contracts more than the permeable or porous (e.g. refractory oxide) film. The physical dimensions of the film were defined at the sintering temperature and matched those of the support at that temperature. So long as the film is sufficiently well bonded so as not to spall off, the major stressing of the film is compressive, an ideal situation from the viewpoint of a ceramic structural component. Thus, when the microporous film is subjected to a high pressure difference in use, it will only be loaded in tension when the original compressive pre-loading, which can be predicted and controlled in advance, is backed off to a sufficient degree.

The following advantages should be noted for various embodiments of the invention:
a) The composite membranes are plastically deformable without substantial loss of filter performance, and are therefore less likely to suffer from handling abuse.
b) Although defects are inevitable in films formed of refractory oxides, these defects do not propagate, because the films are in compression rather than tension at ambient temperature.
c) Supports of metal or glass fibre mesh are cheap compared to ceramic supports.
d) Metal supports are easily fixed, e.g. by welding, crimping or brazing, to a rigid metallic support structure, either before or after application of the film.
e) Woven and non-woven mesh sheets are very flexible and can readily be formed into desired shapes such as tubes or spirals prior to application of the sol. Plastically deformable supports can be profiled to create vortices in the fluid being filtered so as to avoid blockage, e.g. as described in U.S. Pat. No. 4,075,091.
f) Metal supports are electrically conductive, and microporous films can be made electrically conductive e.g. by using a doped titania sol or by incorporating in them a minor proportion of graphite or other powdered conductor.

The following examples illustrate the invention.

EXAMPLE 1

Materials

A) Substances

Woven stainless steel meshes (industrial wire-cloths) were obtained from Potter and Soar Limited in the form of rolled sheets approximately 1 m×1 m square. Three mesh sizes were chosen, 500 meshes $in^{-1}$ (mesh opening 26 µm, thickness 70 µm), 300 meshes $in^{-1}$ (mesh opening 55 µm, thickness 70 µm), and 70 meshes $in^{-1}$ (mesh opening 200 µm, thickness 340 µm).

The substrates were prepared for coating by preheating in a solution of 7 parts sodium dichromate, 7 parts sulphuric acid and 400 parts water at 70° C. for 15 minutes. This is a standard pretreatment for adhesive bonding of stainless steels.

B) Sol composite and concentration

Boehmite sols of concentration 30 $gl^{-1}$ were prepared as described. 500 ml aliquots of the sols were hydrothermally processed in a 2 liter capacity autoclave for 3 hours at 200° C. The 90 $gl^{-1}$ sols were prepared by thermal evaporation (at 80° C.) of the hydrothermally processed 30 $gl^{-1}$ sols.

C) Binder Composition

Polyvinyl alcohol (PVA) and methyl cellulose (Methocel) binders were obtained in the form of powders.

EXPERIMENTAL PROCEDURE i) Determination of optimum binder composition and concentration.

The binders were diluted with water and added to boehmite sols of concentration 30 $gl^{-1}$ or 90 $gl^{-1}$ alumina. The excess water introduced with the sols with the binders was removed by evaporation. The viscosity of the sol/binder mixtures was measured as a function of the binder concentration. Samples of 500 mesh and 70 mesh stainless steel wirecloth were dipped into the mixtures, withdrawn and examined using optical microscopy to assess the integrity of sol-gel films formed in the mesh openings. Optimum binder concentrations were determined from these observations.

ii) Assessment of coating variables.

Following determination of optimum binder composition and concentration, a matrix of dip coating experiments was conducted using the wirecloth substrates in order to develop a protocol for the preparation of sound sol-gel coatings. This included assessment of coatings formed by sols containing no binder.

Following coating, the sol-gel films formed within the metal substrates were examined in the gel state using optical and scanning electron microscopy (SEM). The composites were calcined using the following heating schedule: heating at 50° C./hour to 200° C., holding 1 hour, heating at 50° C./hour to 450° C., holding 1 hour, followed by a slow furnace cool to room temperature. The calcined samples were examined for coating integrity and thickness using optical microscopy and SEM, and recoated and calcined if cracks were observed. An additional variable was studied during this part of the programme. This involved preheating the stainless steel substrates by coating with a dilute (20 gl$^{-1}$) boehmite sol followed by calcination to 450° using the heat treatment described above. This pretreatment was included in order to assess the effect of depositing a thin layer of sol-gel ceramic on the surface of the steel prior to formation of a suspended sol-gel film within the structure, i.e. to facilitate good inter-facial bonding at the points of suspension. The effect of sol-gel deposition rate was examined by slow draining of the sol from a vessel in which the substrate was immersed. The speed of the draining front was 2 mm min$^{-1}$.

iii) Gas permeability measurements.

25 mm diameter discs were machined or punched from sheets of the metal substrates. Following coating and calcination the permeability of the compositions to a series of gases was determined.

iv) Resistance to deformation.

Crack-free samples (or areas within samples) of coated and calcined 300 mesh composite were determined using SEM. The samples were subjected to controlled plastic deformation by bending and re-examined in the SEM for cracking in the vicinity of deformation.

RESULTS i) Determination of optimum composition and concentration.

A minimum binder addition of 10% to the 90 gl$^{-1}$ sol was required in order to yield an appreciable increase in viscosity. Addition of greater than 50 w/o binder resulted in gelation. Optimum binder additions were determined to be 18 w/o for the 90 gl$^{-1}$ sol and 40 w/o for the 30 gl$^{-1}$ sol. Both binders were selected for further study, as their effect on sol viscosity was similar.

ii) Assessment of coating variables.

Results of the experimental matrix, conducted using wire-cloth substrates, are shown in Table 1. The coatings have been graded numerically, from 1 to 5, the highest value corresponding to the achievement of sol-gel films substantially free from cracks or pinholes. Some cracking was present in all of the films formed by initial coating. There appeared to be an optimum mesh size for coating, 300 meshes per inch, in which generally less cracking was observed. The 70 mesh wire-cloths could only be coated using the higher concentration sols.

Coatings formed from sol/binder mixtures contained less cracks than coatings formed from sols alone. PVA and Methocel behaved similarly in this respect.

Most of the coatings could be improved by post-coating with a second coat of either sol alone, in the case of samples containing small cracks, or sol/binder where larger cracks were present. Occasional fine cracks, observed in otherwise good membranes are likely to have been caused by non-optimisation of the coating technique or by the presence of impurities, e.g. dust particles, in the sol. Crack-free coatings can be made by repeated dipping of the mesh into sols containing no thickening agent.

Slow dipping, by immersion of the substrate into a vessel containing 90 gl$^{-1}$ sol plus 20 gl$^{-1}$ Methocel followed by draining of the mixture from the vessel, produced excellent sol-gel films containing very few defects on the first coating. Coatings were less successful when applied using this method with the 30 gl$^{-1}$ boehmite/20 gl$^{-1}$ Methocel sol/binder mixtures.

TABLE 1

| Sol Composition | Pre-Treatment | 500 Mesh Coat No. 1 | 500 Mesh Coat No. 2 | 300 Mesh Coat No. 1 | 300 Mesh Coat No. 2 | 70 Mesh Coat No. 1 | 70 Mesh Coat No. 2 |
|---|---|---|---|---|---|---|---|
| 90 gpl Sol | — | 2 | 3 | 3 | 3 | 1 | 3 |
| 20 gpl Methocel | √ | 2 | 3 | 3 | 4 | 1 | 3 |
| 90 gpl Sol | — | 2 | 3 | 2 | 3 | 1 | 1 |
| 20 gpl V.A. | √ | 2 | 4 | 2 | 4 | 1 | 1 |
| 30 gpl Sol | — | 2 | 3 | 2 | 3 | 1 | 2 |
| 20 gpl Methocel | √ | 2 | 5 | 3 | 4 | 1 | 2 |
| 30 gpl Sol | — | 2 | 3 | 2 | 4 | 0 | 1 |
| 30 gpl P.V.A. | √ | 2 | 3 | 1 | 5 | 1 | 1 |
| 90 gpl Sol | — | 1 | 1 | 1 | 2 | 0 | 1 |
|  | √ | 1 | 1 | 1 | 2 | 0 | 0 |
| 30 gpl Sol | — | 0 | 1 | 0 | 0 | 0 | 0 |
|  | √ | 0 | 1 | 0 | 0 | 0 | 0 |

NUMERICAL GRADING
0: SOL-GEL FILM ON MESH SURFACE ALONE
1: MACROSCOPIC CRACKING OBSERVED
2: FINE CRACKS OBSERVED OPTICALLY
3: NO CRACKS OBSERVED OPTICALLY, CRACKS OBSERVED IN SEM
4: FEW CRACKS OBSERVED IN SEM
5: GENERALLY CRACK FREE IN SEM

EXAMPLE 2

A piece of 300 mesh stainless steel woven wire cloth was pretreated by immersion in a solution of 7 parts sodium dichromate, 7 parts sulphuric acid and 400 parts water at 71° C. for 15 minutes. The mesh was dip coated in an aqueous mixture of a hydrothermally processed 30 g/l boehmite sol and 20 g/l Methocel. A single dip was followed by calcination by heating in air using the following heating schedule: 50° C./hour to 200° C.; holding for 1 hour; 50° C./hour to 450° C.; holding for 1 hour; furnace cooling to room temperature. The coating and calcination procedure was then repeated using a 30 g/l boehmite sol.

A 25 mm diameter sample of each of the two materials was sealed into a holder with a Viton 'O'-ring. Thus the membrane separated two chambers, each of which had a single port. Helium gas was then fed into one chamber under pressure; it diffused through the ceramic membrane and passed out of the other chamber through a non-return valve. The helium gas-flow rate was controlled in the range 10 ml to 100 ml/min. normalized to standard temperature and pressure. This was done by using a commercially available mass flow controller. The pressure drop across the membrane needed to maintain the set flow rate was then measured with a differential pressure gauge. By plotting graphs of differential pressure against flow-rate for both samples and obtaining linear relationships passing through the origin over the complete range of flow-rates, it was demonstrated that there was no significant leakage of Helium gas around the 'O'-ring seal. By performing replicate experiments and obtaining, within normal experimental variance, identical results, it was judged that the specimens had not suffered any cracking of the ceramic component during the first test. This was confirmed by light microscopical examination of the samples after they had been removed from the experimental cell. The temperature at which the experiment was carried out was 40° C. and the effective diameter for gas permeation was 22 mm.

The results of the test were 1462 ml/min/cm$^2$/Bar. Since the ceramic meniscus thicknesses were not constant the results are quoted in units of flux per unit pressure difference across each membrane.

EXAMPLE 3

A sample of 300 mesh stainless steel wirecloth was pretreated according to the procedure described in Example 2. The mesh was dip coated in a mixture of 30 gl$^{-1}$ boehmite sol, hydrothermally processed for 3 hours at 200° C., and 20 gl$^{-1}$ polyvinyl alcohol, and heat treated according to the schedule described in Example 2. Scanning electron microscopy of the coated and heat treated mesh revealed complete penetration of the mesh opening by a thin sol-gel membrane. The mesh was plastically deformed by bending the sample through 20° of permanent deformation around a cylindrical former of radius 3 mm. Scanning electron microscopy of the deformed area revealed no evidence of cracking in the suspended sol-gel film. Very minor cracking had initiated at the sol-gel/metal interface of the inner strand of metal forming a woven mesh corner. This is very probably the point of maximum strain in the system during stressing.

EXAMPLE 4

Preparation of Microporous Zirconia Membrane 3.5 g of Methocel binder was dissolved in 100 ml of distilled and deionised water. 30 g of sub-micron zirconia powder was added to the mixture to form a slurry, which was then ball-milled for 24 hours.

25 mm discs of woven 100 mesh hastelloy (a Ni, Cr, Fe, Si, Mn, Mo alloy, the mesh supplied by G. Bopp & Co., London N2) were coated with the slurry using a simple dipping or painting procedure, and fired to 800° C. in a mild reducing atmosphere. A second coat was applied in order to heal small cracks in the first coat, after which the firing schedule was repeated.

The composite membrane thus formed comprised menisci of zirconia suspended within the Hastelloy mesh interstices. These menisci had a minimum thickness of 15 to 20 μm. The membrane exhibited a pure water flux of 0.2 mn min$^-$ cm$^{-2}$ at 10 psi and a gas burst pressure in excess of 10 bar. The membrane, could be cut into a desired shape after firing without incurring mechanical failure of the suspended ceramic films.

EXAMPLE 5

A Boehmite sol of concentration 30 gl$^{-1}$ was prepared by controlled hydrolysis of aluminium alkoxide. The dried and calcined (450° C.) gel formed from the sol was highly porous, with a mean pore size of about 10 nm.

One face of the porous membrane described in Example 4 was coated with the Boehmite sol by contacting the membrane with the surface of the sol, followed by drying in air and heat treating for 1 hour at 450° C. The composite membrane thus formed had a sol-gel coating approximately 2 μm thick, and exhibited a pure water flow rate of 0.01 ml/min/cm$^2$ at 16 psi.

EXAMPLE 6

6 g of methyl cellulose was dissolved in 75 ml of distilled and deionised water. 47.25 g of this mixture was combined with 52.75 g of water and 35 g of a zirconia powder of mean particle size less than two microns. The slurry thus formed was ball milled for 3 hours. Sheets of woven 100 mesh Iconel 600 (Nickel—chromium—Iron alloy, the mesh sup- plied by G. Bopp and Co.) were coated with the slurry using a simple painting procedure, such that the interstices of the mesh were filled with discrete menisci formed from the slurry. The coated sheet was heat treated at 950° C. for 1 hour which resulted in the formation of a microporous composite membrane comprising menisci of porous zirconia suspended within the metal mesh interstices. The menisci had a typical thickness of between 40 and 80 μm and exhibited a pure water flux, in dead end filtration mode, of between 8 and 10 ml min$^{-1}$ cm$^{-2}$ at 10 psi.

EXAMPLE 7

A slurry was prepared according to the recipe described in Example 6, except that 10 weight percent of the zirconia was replaced by another zirconia powder of mean particle size less than 0.2 μm, thus giving rise to a bimodal particle size distribution. The slurry was ball milled for 4 hours and subsequently brush coated on a sheet of woven mesh Inconel 600. The coated sheet was heat treated at 950° C. for 1 hours and the resulting microporous membrane exhibited a pure water flux at 10 psi of 1–2 ml min$^{-1}$ cm$^{-2}$ at 10 psi, and retained >99% when challenged with an aqueous dispersion of 0.22 μm diameter latex beads. The air burst pressure of the membrane exceeded 8 bar.

EXAMPLE 8

A slurry was prepared according to the method described in Example 6, excepting that the zirconia powder was of slightly larger mean diameter (2.5 μm) and the composition included the addition of 1.75 g of yttria powder. The slurry was ball milled for 3 hours and coated onto sheets of 100 mesh Inconel. The composite was heat treated at 1100° C. for 1 hour and the microporous membrane thus formed exhibited a pure water flux at 10 psi of 15 ml min$^{-1}$ cm$^{-2}$ and an air burst pressure in excess of 20 bar.

EXAMPLE 9

A composite microporous membrane prepared according to the method described in Example 7 was pretreated by dipping for 30 seconds in a 5 wt % sodium silicon solution and air dried. A boehmite sol of concentration 30 gl$^{-1}$ was prepared by controlled hydrolysis of aluminium alkoxide was hydrothermally treated for 5 hours at 250° C. The composite microporous membrane was coated on one face with the boehmite sol by contacting the surface of the membrane with the liquid sol. After heat treating at 450° C. for 1 hour the composite ultrafiltration membrane then formed exhibited a thin discreet sol-gel coating with a pore size of 15 nm with no evidence of craters or pinholes.

When forming membranes based on aqueous slurries of ceramic powders, it is advantageous to pretreat a metal support chemically in order to improve the coating behaviour of the slurry and hence improve the production and quality of the product.

Several chemicals may be used for this type of pretreatment. For example, phosphate and dichromate anions enhance the coating process. Preferably the pre-treatment agent is sodium phosphate used at concentrations of 1–20% by weight in water. The pre-treatment process may be adjusted to best operate on a particular substrate but typically involves contacting the metal support with the pretreatment solution for a period of 10 seconds to 10 minutes. The pre-treatment may be carried out at ambient temperature, but improved performance may be observed at temperatures in the range 50° C.–80° C. It may be advantageous to pass a current e.g. of up to 30 Amps through the metal mesh during pre-treatment.

EXAMPLE 10

The general procedure of Example 6 was followed, except that the metal mesh substrates were pre-treated by immersion in an aqueous solution of 5% by weight of sodium phosphate. Immersion was for 1 minute and the solution was maintained at 58° C. In some cases an electric current was passed through the metal mesh during pretreatment; in other cases electric current was not used. Each mesh was thus subjected to the following sequence of operations:

Pre-treatment in sodium phosphate.
Rinse and dry.
Immersion in zirconia slurry.
Dry and fire.
Pre-treatment in sodium phosphate solution (this step was sometimes omitted).
Rinse and dry.
Immerse in zirconia slurry.
Dry and fire.

For comparison purposes, some samples of the metal mesh were not given either phosphate pretreatment. The composite membranes made from those samples contained numerous defects and were useless for filter purposes. By contrast, all composite membranes made from the samples of metal mesh subjected to the one or two phosphate pre-treatment steps showed only one or a few defects and were suitable for use as filters.

To increase the active surface area of membrane in a housing or to increase the cross-sectional area of flow channels within a housing, the composite membrane of this invention can be corrugated.

Corrugation may conveniently be carried out on the metal mesh or other inorganic support prior to coating with the ceramic slurry. Corrugation may readily be effected by known means for example the use of a toothed wheel. Where commercially available woven metal mesh is typically 20–400 μm thick, the corresponding corrugated mesh may typically have a final thickness of 0.5 mm–20 mm with a diametric pitch of from 5–50. A preferred mesh thickness is 1.6 mm with a diametric pitch of 24. When corrugation has been effected by means of a pair of toothed rollers, the diametric pitch is the size of each tooth expressed as the number of teeth per inch of the average diameter of the wheel.

Corrugated mesh is preferably dip coated with ceramic slurry with the corrugations vertical, in order to improve run-off of excess slurry.

Reference is directed to the accompanying drawings in which:

BRIEF DESCRIPTION OF THE DRAWINGS

FIGS. 5, 5a, 5b, 5d, 5e, 5f, 5g, 5h and 5i show steps in the assembly of a filtration device in a spiral format containing a flat sheet composite membrane.

FIGS. 6, 6a, 6b, 6c, 6d, 6e, 6f, 6g and 6h show steps in the assembly of a filtration device in a spiral format containing a corrugated composite membrane.

The composite membranes described above can be used in filtration devices of various formats which constitute further features of this invention.

In one filtration device, a flat or corrugated composite membrane is arranged as the filter membrane in a plate and frame format. Two such devices are illustrated in FIGS. 1a, 1b, 2a and 2b and in FIGS. 3a, 3b, 4a and 4b.

Figure 1A:
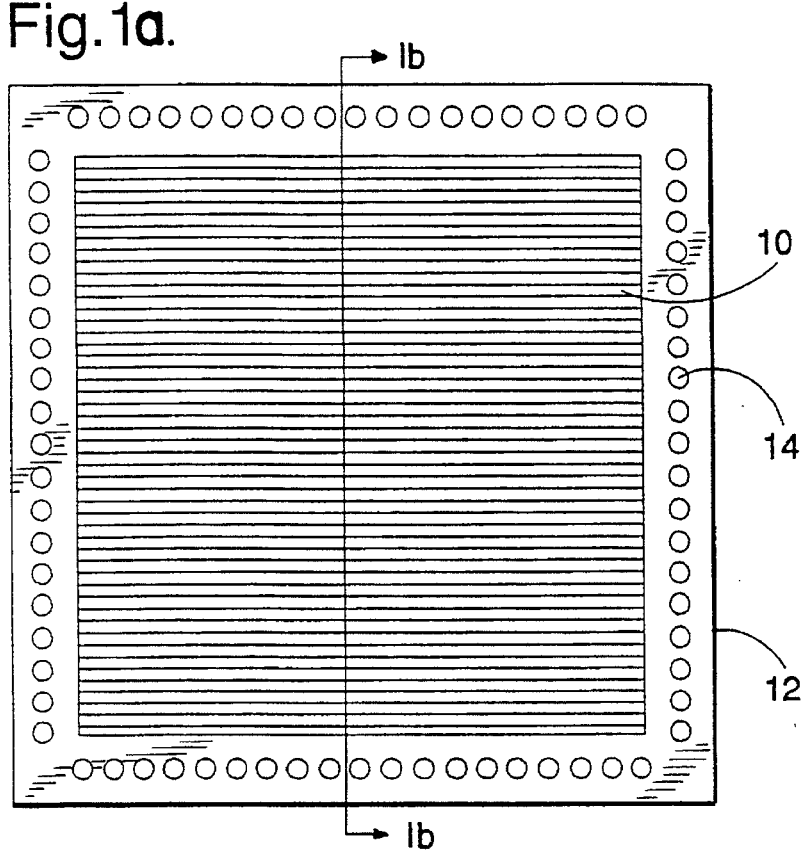
FIGS. 1a, 1b, 2a and 2b are plan and associated cross section views of a plate and frame arrangement with a corrugated composite membrane.
Figure 1B:
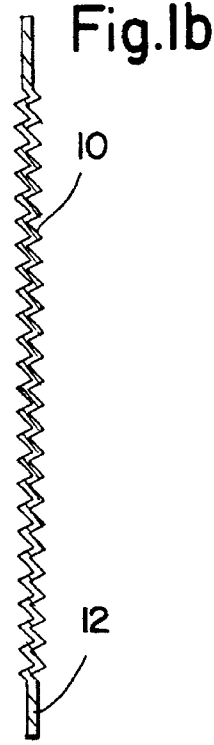
Figure 2A:
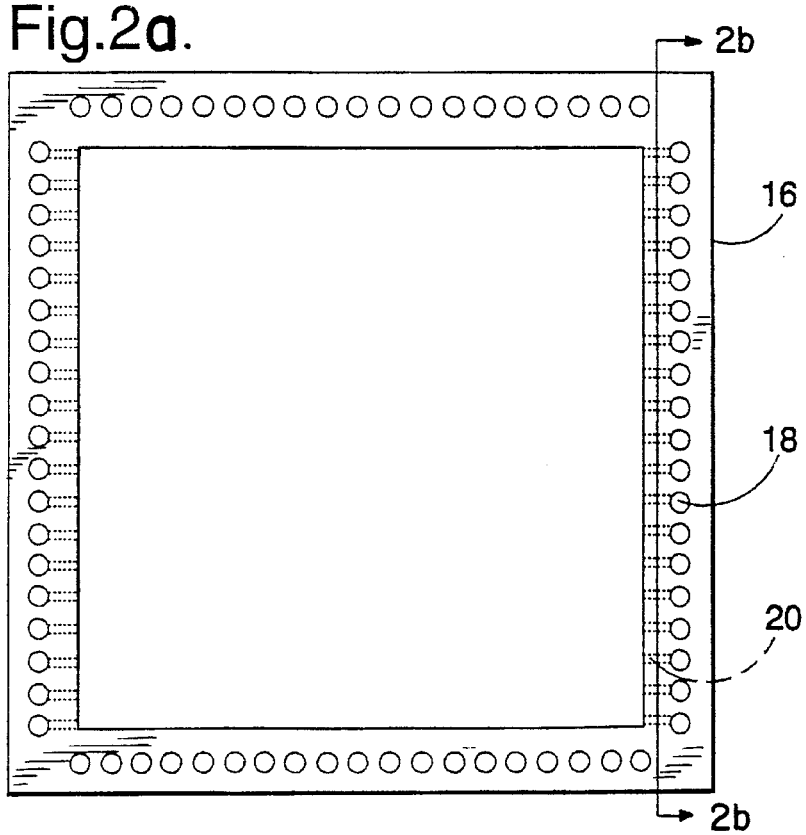
Figure 2B:
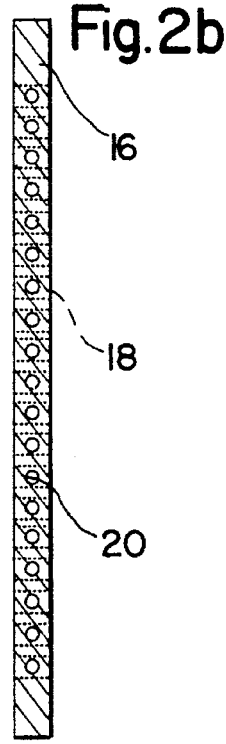

As shown in FIGS. 1a–2b, a plate and frame arrangement comprises two elements, a filter and a gasket. As shown in FIGS. 1a (plan) and 1b (cross section on line 1b—1b of FIG. 1a), the filter consists corrugated sheet 10 of a composite membrane according to the invention held in a square frame 12, with a plurality of holes 14 spaced along each side of the frame and extending transversely through it. As shown in FIGS. 2a (plan) and 2b (cross section on line 2b—2b of FIG. 2a), a gasket consists of a square frame 16 with holes 18 spaced along each side and extending transversely through the frame. The holes on one pair of opposite sides of the frame are connected by ports 20 to a region within the frame. A filter device is formed by stacking alternate filter and gasket elements, with every second gasket element being rotated by 90° from the position shown in FIGS. 2a and 2b.

Figure 3A:
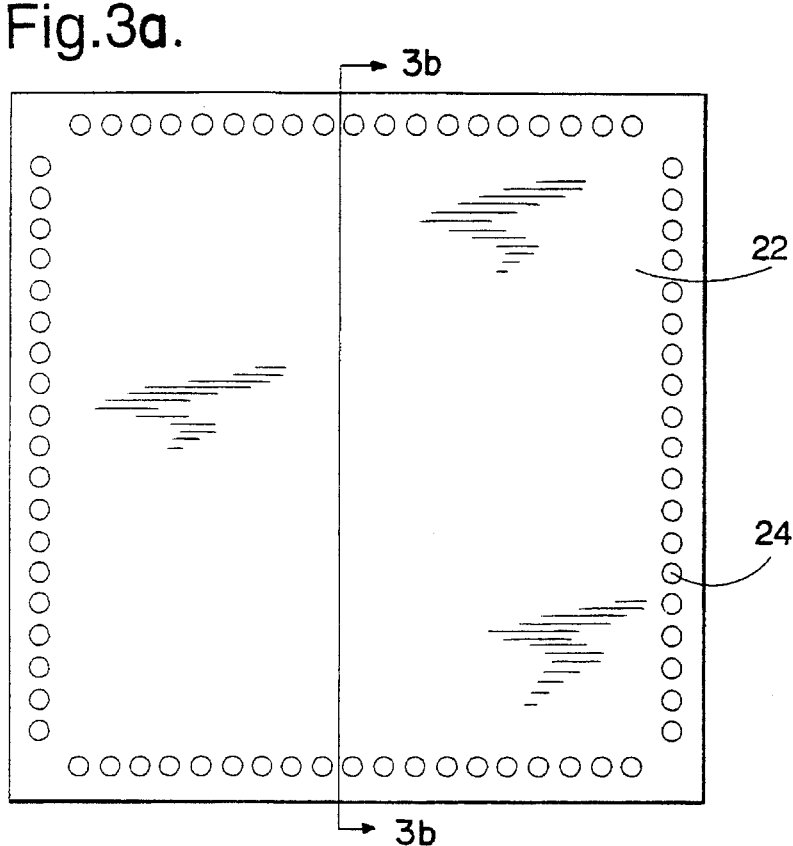
FIGS. 3a, 3b, 4a and 4b are plan and cross section views of a plate and frame arrangement with a flat sheet composite membrane.
Figure 3B:
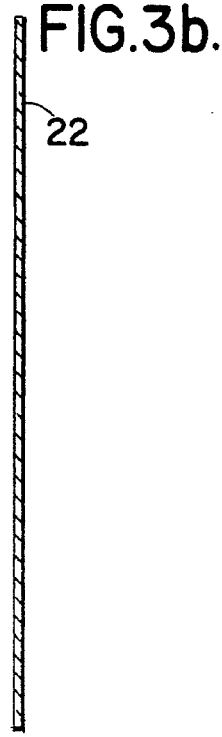
Figure 4A:
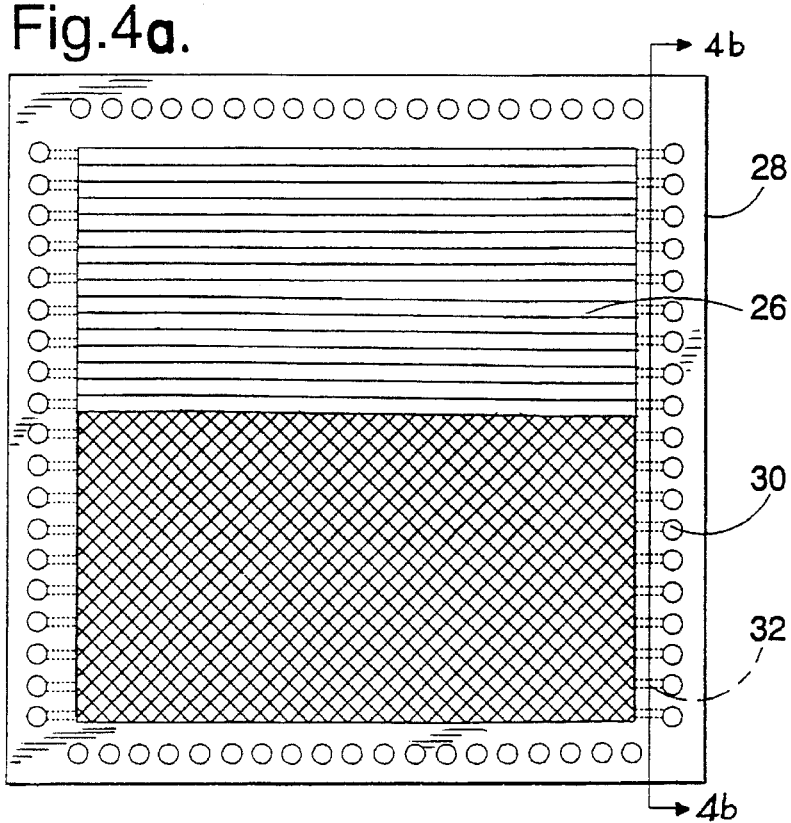
Figure 4B:
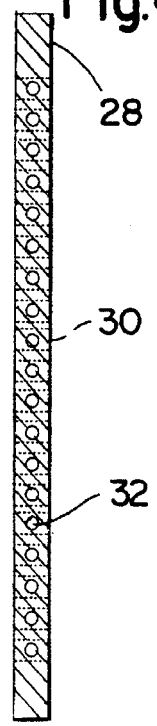

A different arrangement is shown in FIGS. 3a–4b. In FIGS. 3a (plan) and 3b (cross section on line 3b—3b of FIG. 3a), a filter element consists of a sheet 22 of a composite membrane as described, with transverse holes 24 spaced along each side. FIGS. 4a (plan) and 4b (cross section on line 4b—4b of FIG. 4a) shows a gasket element consisting of a corrugated or mesh member 26 held in a square frame 28 with holes 30 spaced along each side and extending transversely therethrough. Each hole 30 is connected by a port 32 to a region within the frame. A filter device is formed by stacking alternating filter and gasket elements as described for FIGS. 1a–2b.

Figure 7A:
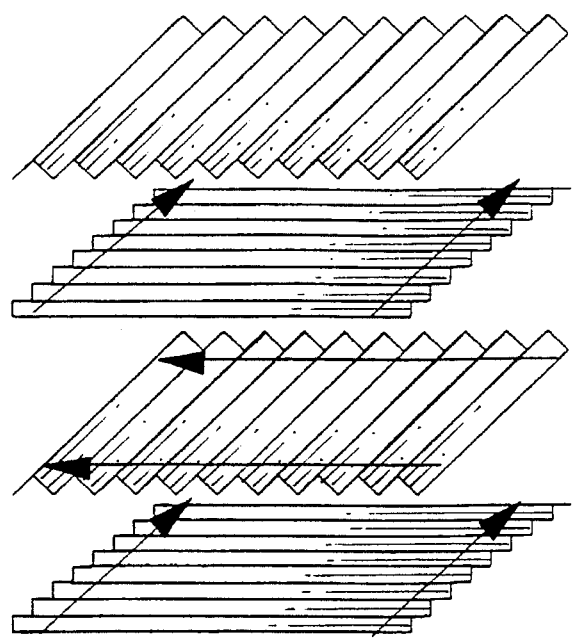
FIGS. 7a and 7b show a corrugated membrane arrangement sealed in a housing.
Figure 7B:
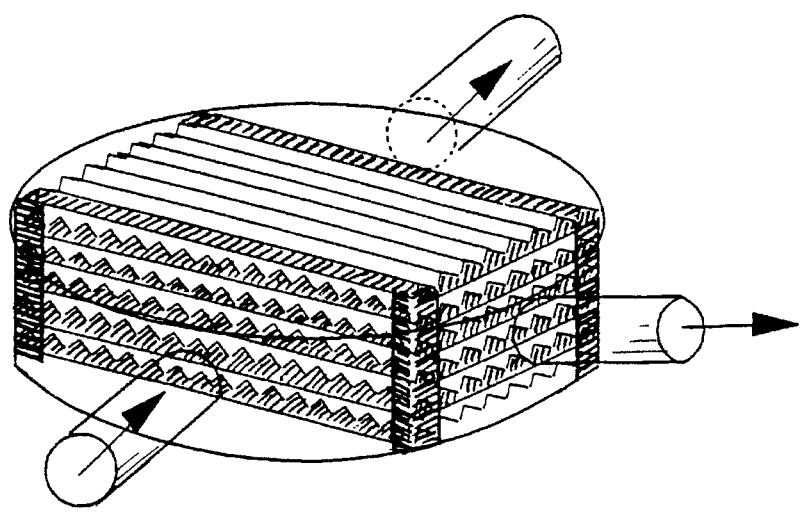

A different arrangement is shown in FIGS. 7a and 7b which eliminates the need for gaskets. The illustrated arrangement is a corrugated membrane arrangement sealed in a housing; FIG. 7a shows the assembly of the arrangement, with arrows indicating glue lines; FIG. 7b is an illustration of the sealed unit. The filter device consists of a plurality of square corrugated composite membrane sheets typically 10×10 cm to 1×1 m in size stacked together with alternate sheets having corrugations perpendicular to each other. The feed and permeate channels are formed by applying glue lines (for example epoxy or polyurethane adhesive) in parallel and at opposite ends of the corrugated plates. The glue lines are positioned on alternate plates perpendicular to each other and the plates are sealed with adhesive to the inner wall of a preferably cylindrical housing (but could be other shape) and to the end plates, to form an integral seal for the feed and permeate channels. The feed and permeate connections can be positioned either on the cylinder wall (as illustrated in FIG. 7b, where the permeate connection is on the right, the feed in connection is at the lower left, and the feed out connection is diametrically opposite the feed in connection) or on the end plates. If large membrane areas are required then the housings can be connected together in series or parallel.

In another filtration device a composite membrane as described herein and a spacer sheet are arranged in a spiral format on a product tube.

In one such embodiment two filter membranes and an interposed spacer sheet are arranged in the spiral format.

With reference to FIG. 5, a procedure for making such a filtration device is as follows:

A sheet of permeate fabric is attached to a product tube using contact adhesive or hot melt glue (FIG. 5a).

A first sheet of a composite membrane according to the invention is laid directly on top of the permeate fabric (FIG. 5b).

A piece of corrugated stainless steel foil, net or gauze feedspacer is placed on top of the composite membrane (FIG. 5c).

A second sheet of composite membrane is then placed directly on the feedspacer (FIG. 5d).

Figure 5E:
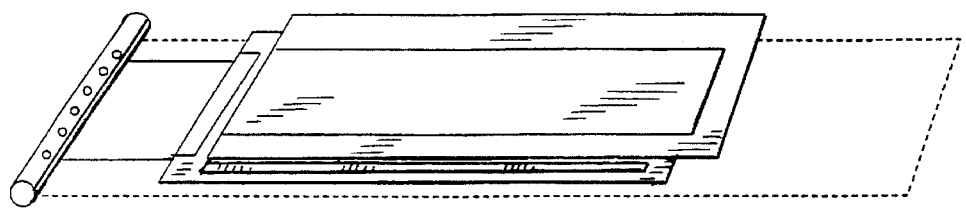

Glue lines are marked round the periphery of the top membrane and front edges of the permeate fabric, a further line is drawn at right angles in from the front edge of the lower composite membrane sheet (FIG. 5e).

Figure 5F:
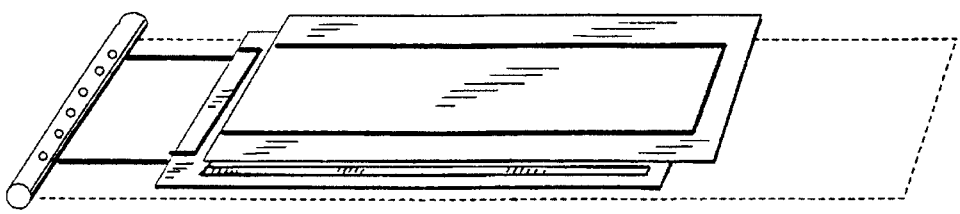

A bead of adhesive (typically epoxy or polyurethane) is applied along the pencil line (FIG. 5f).

Figure 5G:
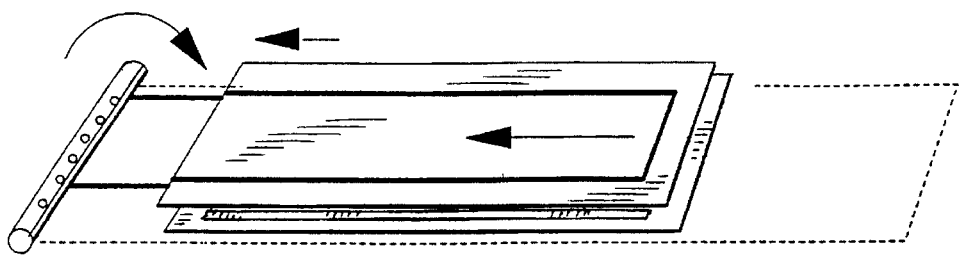

The top sheet of composite membrane is then lifted over the front edge of the lower sheet and placed slightly in front (FIG. 5g).

Figure 5H:
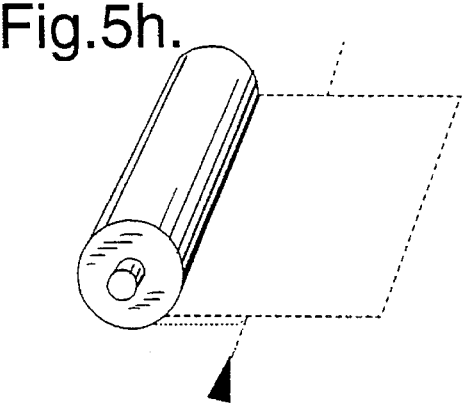

The element is wound by rotating the tube mount clockwise. Winding is stopped when the end of the feedspacer is in line with the tube and the permeate material is cut to size (FIG. 5h).

Figure 5I:
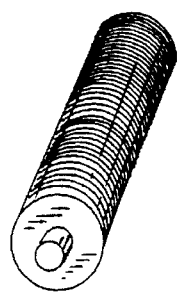

The winding operation is completed by winding an outer wrap of adhesive tape. This can be removed after the adhesive has been cured. If required a protective shrink-wrap covering can be applied (FIG. 5i).

In another format, two composite filter membranes are arranged in a spiral format on a product tube, one or each filter membrane being corrugated, thus obviating the need for a spacer sheet. With reference to FIG. 6, a method of making such a device comprises the following steps:

A sheet of permeate fabric is attached to a product tube using contact adhesive tape or hot melt glue (FIG. 6a).

A flat sheet of composite membrane is laid directly on top of the permeate fabric (FIG. 6b).

A corrugated sheet of composite membrane is then placed directly on the flat sheet (FIG. 6c).

Figure 6D:
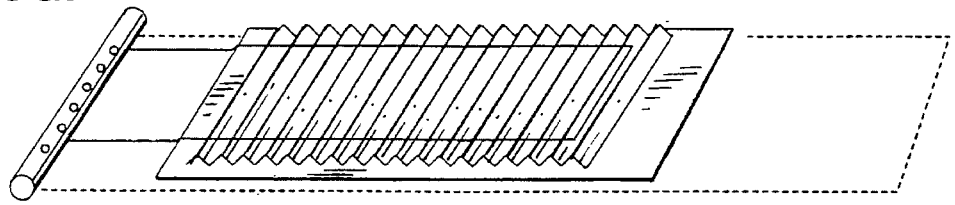

Glue lines are marked round the periphery of the top membrane and front edges of the permeate fabric (FIG. 6d).

Figure 6E:
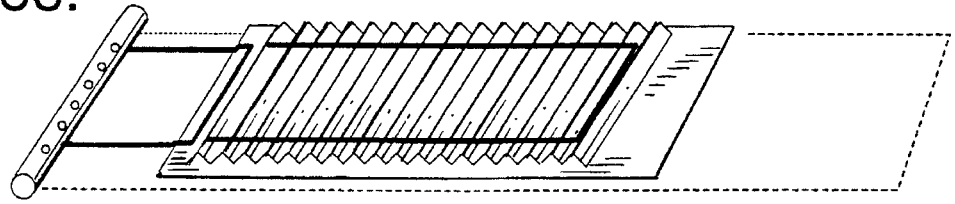

A further glue line is drawn at right angles in from the front edge of the lower composite sheet (FIG. 6e).

Figure 6F:
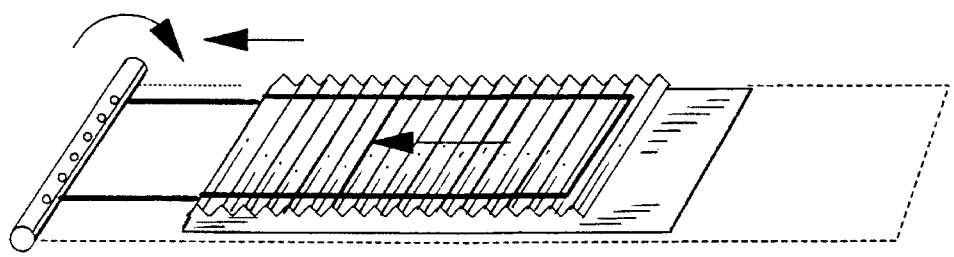

A bead of adhesive (typically epoxy or polyurethane) is applied along the pencil line. The corrugated sheet of membrane is then lifted over the front edge of the lower sheet and placed slightly in front. The element is wound up by rotating the tube mount clockwise (FIG. 6f).

Figure 6G:
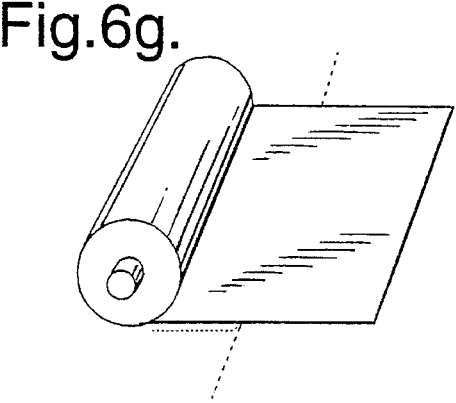

The permeate material is cut to size (FIG. 6g).

Figure 6H:
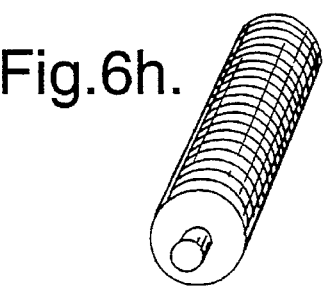

The winding operation is completed by winding an outer wrap of adhesive tape (FIG. 6h). This can be removed after the adhesive is cured. If required a protective shrink-wrap covering can be applied.

In both devices of FIGS. 5 and 6, the product tube constitutes an outlet for permeate. An inlet (now shown) is provided parallel to but radially spaced from the product tube.

EXAMPLE 11

Devices can be made in various sizes, in particular 2.5 inches or 4 inches diameter so that they can fit standard pressure vessels. Devices can be made from various combinations of materials. Typical membrane areas in elements with flat sheets are 0.4 m$^2$, 0.8 m$^2$, 2.5 m$^2$. With corrugated spacers membrane areas of 0.2 m$^2$ and 0.6 m$^2$ are used. Typically the device is operated in the pressure range 0.5–3.5 bar. The pure water flux of the 0.1 µm pore size membrane is typically 200–600 L/m$^2$/hr/bar. A typical crossflow in operation is 0.5–1 m/s for the mesh format and 1–3 m/s for the corrugated format. The following materials are used in the construction.

Membrane—composite membrane according to the invention with pore sizes typically 0.08, 0.1 and 0.2 µm.

Feed spacer—polypropylene mesh or 316 stainless steel corrugated sheet.

Permeate spacer—polypropylene, polyester/epoxy.

Outer wrap—polyolefine or highly chemical resistant FEP.

Adhesive—epoxy resistant at low and high pH.

Housing and product tube—316 stainless steel.

Spiral wound configurations as described above have been evaluated at both laboratory and pilot process scale. A wide variety of feeds have been processed from a range of industries including: water/waste water; solvents; oil/water mixes; caustic cleaning chemicals; abrasive slurries; biotechnology (cell harvesting); food and beverage. Specific details of one of these applications is given below.

EXAMPLE 12

Most large dairies and milk processors have installed clean in-place systems using both acid and alkali chemicals. These chemicals gradually collect milk products, and when the concentrations of these increase the chemicals are replaced. This represents a high cost to the dairy in the purchase of chemicals and the disposal of spent solutions. A filter device according to this invention has been used successfully to remove contaminants from these chemicals thus extending their life and reducing disposal costs.

A filtration device in a spiral format incorporating flat composite membranes of the invention with a polypropylene mesh as the feed spacer material has been successfully trialed on a pilot system at a customer site. In this particular case the cleaning chemicals had been used to remove contaminants from evaporators used during part of the milk processing. No pre- or post-treatment was required. The system was operated in batch mode with volume to process of 2–3000 gallons. A typical run takes the spent chemicals stream into a batch tank and then processes it to a 8 times volumetric concentration. This represents an approximately 90% volumetric reduction in the waste generated per processed batch. The fluxes were high, at a steady state of 100 l/m$^2$/hr. The module was operated at low cross flow velocity (0.6 m/sec), with a feed temperature of 60° C. Several batches were processed with very little variability seen.

We claim:

1. A composite membrane comprising an inorganic support composed of woven or non-woven fibres and having interstices of diameter greater than 5 µm and length less than ten times their diameters, and porous inorganic films of sintered non-metallic particles carried by the support and bridging the interstices thereof, the films having pore sizes up to 2 µm.

2. A membrane as claimed in claim 1 which is plastically deformable without substantially altering the porosity of the films.

3. A membrane as claimed in claim 1, wherein the films are substantially co-planar with the support.

4. A membrane as claimed in claim 1, wherein the support is a woven metal mesh.

5. A membrane as claimed in claim 1, wherein the support is composed of fibres and the non-metallic particles of the films have an average diameter not more than 20% of the average diameter of the fibres.

6. A membrane as claimed in claim 1, wherein the films carry on at least one surface a microporous inorganic coating formed by a sol-gel technique.

7. A membrane as claimed in claim 1, wherein the films carry on at least one surface a microporous inorganic coating formed by a non-sol-gel technique.

8. A composite membrane as claimed in claim 1, wherein the composite membrane is in the form of a sheet wound into a spiral shape.

9. A composite membrane comprising an inorganic support composed of woven or non-woven fibres and having interstices of diameter greater than 5 μm and length less than ten times their diameters, and porous inorganic films of sintered non-metallic particles carried by the support and bridging the interstices thereof, the films having pore sizes up to 2 μm, wherein the membrane is corrugated.

10. A composite membrane as claimed in claim 9, wherein the thickness of the corrugated membrane is 0.5–20 mm with a diametric pitch of 5–50.

11. A method of making a composite membrane according to claim 1 by the use of an inorganic support composed of woven or non-woven fibres and having interstices of diameter greater than 5 μm and length less than ten times their diameters, which method comprises applying to the support a suspension of sinterable inorganic non-metallic particles, so as to create films bridging the interstices thereof, and drying and heating the films to partly sinter the particles.

12. A method as claimed in claim 11, wherein the suspension of particles is in a solution of an organic polymer, and the heating is performed so as to remove the polymer from the membrane.

13. A method as claimed in claim 11, wherein the suspension comprises from 60–95% by weight of larger particles of average size from 0.5–50 μm and correspondingly from 40–5% by weight of smaller particles of average size from 4 nm to 1 μm but not more than 0.1 times the average size of the larger particles.

14. A method as claimed in claim 11, wherein an inorganic support composed of woven or non-woven metal fibres is pre-treated by being contacted with a solution containing dichromate anions.

15. A method of making a composite membrane, by providing an inorganic support composed of woven or non-woven metal fibres and having interstices of diameter greater than 5 μm and less than ten times their diameter, pre-treating the support to improve its coating properties by contacting it with a solution containing phosphate anions, applying to the pretreated support a suspension of sinterable inorganic non-metallic particles, so as to create films bridging the interstices thereof, and drying and heating the films to partly sinter the particles the films having pore sizes up to 2 μm.

16. A method as claimed in claim 15, wherein the support is pre-treated by being contacted with an aqueous solution of a sodium phosphate at a concentration of 1–20% by weight and a temperature of ambient up to 80° C. for 10 seconds–10 minutes.

17. In a filtration device wherein a filter membrane and a spacer sheet are arranged in a spiral format on a product tube, the improvement which consists is that the filter membrane is a composite membrane comprising an inorganic support composed of woven or non-woven fibres and having interstices of diameter greater than 5 μm and length less than ten times their diameters, and porous inorganic films of sintered non-metallic particles carried by the support and bridging the interstices thereof, the films having pore sizes up to 2 μm.

18. In a filtration device wherein two filter membranes and an interposed spacer sheet are arranged in a spiral format on a product tube, the improvement which consists is that one or each filter membrane is a composite membrane comprising an inorganic support composed of woven or non-woven fibres and having interstices of diameter greater than 5 μm and length less than ten times their diameters, and porous inorganic films of sintered non-metallic particles carried by the support and bridging the interstices thereof, the films having pore sizes up to 2 μm.

19. In a filtration device wherein two filter membranes are arranged in a spiral format on a product tube, one or each filter membrane being corrugated, the improvement which consists is that one or each filter membrane is a composite membrane comprising an inorganic support composed of woven or non-woven fibres and having interstices of diameter greater than 5 μm and length less than ten times their diameters, and porous inorganic films of sintered non-metallic particles carried by the support and bridging the interstices thereof, the films having pore sizes up to 2 μm.

20. In a filtration device wherein a flat or corrugated filter membrane is arranged in a plate and frame format, the improvement which consists is that the filter membrane is a composite membrane comprising an inorganic support composed of woven or non-woven fibres and having interstices of diameter greater than 5 μm and length less than ten times their diameters, and porous inorganic films of sintered non-metallic particles carried by the support and bridging the interstices thereof, the films having pore sizes up to 2 μm.

21. In a filtration device comprising a stack of corrugated filter membrane plates arranged so that the corrugations of alternate plates are perpendicular and sealed to form separated feed and permeate channels and integrally sealed into a housing having an inner vessel wall and end plates, the improvement which consists in that the filter membrane is a composite membrane comprising an inorganic support composed of woven or non-woven fibres and having interstices of diameter greater than 5 μm and length less than ten times their diameters, and porous inorganic films of sintered non-metallic particles carried by the support and bridging the interstices thereof, the films having pore sizes up to 2 μm.

\* \* \* \* \*